United States Patent
Tamai et al.

(10) Patent No.: US 8,155,814 B2
(45) Date of Patent: Apr. 10, 2012

(54) METHOD OF OPERATING A VEHICLE UTILIZING REGENERATIVE BRAKING

(75) Inventors: Goro Tamai, West Bloomfield, MI (US); Thomas S. Miller, Lagrange, OH (US); Scott J Thompson, Waterford, MI (US); Lawrence A. Kaminsky, Sterling Heights, MI (US); Jy-Jen F. Sah, West Bloomfield, MI (US); Anthony H. Heap, Ann Arbor, MI (US)

(73) Assignees: GM Global Technology Operations LLC, Detroit, MI (US); Daimler AG, Stuttgart (DE); Chrysler LLC, Auburn Hills, MI (US); Bayerische Motoren Werke Aktiengesekkschaft, Munich (DE)

( * ) Notice: Subject to any disclaimer, the term of this patent is extended or adjusted under 35 U.S.C. 154(b) by 723 days.

(21) Appl. No.: 12/257,447

(22) Filed: Oct. 24, 2008

(65) Prior Publication Data

US 2009/0118886 A1   May 7, 2009

Related U.S. Application Data

(60) Provisional application No. 60/985,220, filed on Nov. 3, 2007.

(51) Int. Cl.
*B60L 11/00* (2006.01)
(52) U.S. Cl. ............... 701/22; 701/51; 701/54; 477/181
(58) Field of Classification Search .................... 701/22, 701/51, 54; 477/181
See application file for complete search history.

(56) References Cited

U.S. PATENT DOCUMENTS

| | | | |
|---|---|---|---|
| 6,278,916 B1 * | 8/2001 | Crombez | 701/22 |
| 6,832,148 B1 | 12/2004 | Bennett | |
| 6,868,318 B1 | 3/2005 | Cawthorne | |
| 7,059,997 B2 * | 6/2006 | Nishizawa et al. | 477/3 |
| 7,154,236 B1 | 12/2006 | Heap | |
| 7,637,846 B2 * | 12/2009 | Tamai et al. | 477/110 |
| 2003/0184152 A1 * | 10/2003 | Cikanek et al. | 303/152 |
| 2005/0060079 A1 * | 3/2005 | Phillips et al. | 701/53 |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |
| 2005/0080535 A1 | 4/2005 | Steinmetz | |
| 2005/0080537 A1 | 4/2005 | Cawthorne | |
| 2005/0080538 A1 | 4/2005 | Hubbard | |

(Continued)

*Primary Examiner* — James Trammell
*Assistant Examiner* — Truc M Do

(57) ABSTRACT

A vehicle includes a powertrain system and a friction braking system, the powertrain system including a hybrid transmission operative in one of a fixed gear operating range state and a continuously variable operating range state to transmit torque between an input member and a torque machine and an output member coupled to a driveline. A method for operating the vehicle includes monitoring operator inputs to an accelerator pedal and a brake pedal, monitoring vehicle speed, maintaining the transmission in a present operating range state subsequent to the operator disengaging the accelerator pedal absent the operator engaging the brake pedal, transitioning the transmission device to a continuously variable operating range state subsequent to the operator disengaging the accelerator pedal and the operator engaging the brake pedal, executing regenerative braking by controlling the torque machine to react torque through the transmission to brake the vehicle through the driveline when the operator engages the brake pedal and the speed of the vehicle is greater than a first threshold, and disabling the regenerative braking when the operator disengages the brake pedal and subsequently reengages the brake pedal when the speed of vehicle is less than a first threshold and greater less than a second threshold.

19 Claims, 3 Drawing Sheets

U.S. PATENT DOCUMENTS

| | | |
|---|---|---|
| 2005/0080539 A1 | 4/2005 | Hubbard |
| 2005/0080540 A1 | 4/2005 | Steinmetz |
| 2005/0080541 A1 | 4/2005 | Sah |
| 2005/0182526 A1* | 8/2005 | Hubbard et al. .................. 701/1 |
| 2005/0182543 A1 | 8/2005 | Sah |
| 2005/0182546 A1 | 8/2005 | Hsieh |
| 2005/0182547 A1 | 8/2005 | Sah |
| 2005/0189918 A1 | 9/2005 | Weisgerber |
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1* | 11/2005 | Cawthorne et al. ............. 701/99 |
| 2005/0256633 A1 | 11/2005 | Heap |
| 2005/0256919 A1 | 11/2005 | Cawthorne |
| 2006/0048982 A1* | 3/2006 | Yamamoto et al. .......... 180/65.2 |
| 2006/0102394 A1* | 5/2006 | Oliver .......................... 180/65.2 |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |

| | | | | | |
|---|---|---|---|---|---|
| 2009/0118922 A1 | 5/2009 | Heap | 2009/0118943 A1 | 5/2009 | Heap |
| 2009/0118923 A1 | 5/2009 | Heap | 2009/0118944 A1 | 5/2009 | Heap |
| 2009/0118924 A1 | 5/2009 | Heap | 2009/0118945 A1 | 5/2009 | Heap |
| 2009/0118925 A1 | 5/2009 | Hsieh | 2009/0118946 A1 | 5/2009 | Heap |
| 2009/0118926 A1 | 5/2009 | Heap | 2009/0118947 A1 | 5/2009 | Heap |
| 2009/0118927 A1 | 5/2009 | Heap | 2009/0118948 A1 | 5/2009 | Heap |
| 2009/0118928 A1 | 5/2009 | Heap | 2009/0118949 A1 | 5/2009 | Heap |
| 2009/0118929 A1 | 5/2009 | Heap | 2009/0118950 A1 | 5/2009 | Heap |
| 2009/0118930 A1 | 5/2009 | Heap | 2009/0118951 A1 | 5/2009 | Heap |
| 2009/0118931 A1 | 5/2009 | Kaminsky | 2009/0118952 A1 | 5/2009 | Heap |
| 2009/0118932 A1 | 5/2009 | Heap | 2009/0118954 A1 | 5/2009 | Wu |
| 2009/0118933 A1 | 5/2009 | Heap | 2009/0118957 A1 | 5/2009 | Heap |
| 2009/0118934 A1 | 5/2009 | Heap | 2009/0118962 A1 | 5/2009 | Heap |
| 2009/0118935 A1 | 5/2009 | Heap | 2009/0118963 A1 | 5/2009 | Heap |
| 2009/0118936 A1 | 5/2009 | Heap | 2009/0118964 A1 | 5/2009 | Snyder |
| 2009/0118937 A1 | 5/2009 | Heap | 2009/0118969 A1 | 5/2009 | Heap |
| 2009/0118938 A1 | 5/2009 | Heap | 2009/0118971 A1 | 5/2009 | Heap |
| 2009/0118939 A1 | 5/2009 | Heap | 2009/0118999 A1 | 5/2009 | Heap |
| 2009/0118940 A1 | 5/2009 | Heap | 2009/0144002 A1 | 6/2009 | Zettel |
| 2009/0118941 A1 | 5/2009 | Heap | | | |
| 2009/0118942 A1 | 5/2009 | Hsieh | | | |

* cited by examiner

METHOD OF OPERATING A VEHICLE UTILIZING REGENERATIVE BRAKING

CROSS REFERENCE TO RELATED APPLICATION

This application claims the benefit of U.S. Provisional Application No. 60/985,220 filed on Nov. 3, 2007 which is hereby incorporated herein by reference.

TECHNICAL FIELD

This disclosure is related to hybrid powertrain system control.

BACKGROUND

The statements in this section merely provide background information related to the present disclosure and may not constitute prior art.

Known powertrain architectures include torque-generative devices, including internal combustion engines and electric machines, which transmit torque through a transmission device to an output member. One exemplary powertrain includes a two-mode, compound-split, electromechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate a torque input to the transmission, independently of a torque input from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating range state and gear shifting, controlling the torque-generative devices, and regulating the electrical power interchange among the electrical energy storage device and the electric machines to manage outputs of the transmission, including torque and rotational speed.

SUMMARY

A vehicle includes a powertrain system and a friction braking system, the powertrain system including a hybrid transmission operative in one of a fixed gear operating range state and a continuously variable operating range state to transmit torque between an input member and a torque machine and an output member coupled to a driveline. A method for operating the vehicle includes monitoring operator inputs to an accelerator pedal and a brake pedal, monitoring vehicle speed, maintaining the transmission in a present operating range state subsequent to the operator disengaging the accelerator pedal absent the operator engaging the brake pedal, transitioning the transmission device to a continuously variable operating range state subsequent to the operator disengaging the accelerator pedal and the operator engaging the brake pedal, executing regenerative braking by controlling the torque machine to react torque through the transmission to brake the vehicle through the driveline when the operator engages the brake pedal and the speed of the vehicle is greater than a first threshold, and disabling the regenerative braking when the operator disengages the brake pedal and subsequently reengages the brake pedal when the speed of vehicle is less than a first threshold and greater less than a second threshold.

BRIEF DESCRIPTION OF THE DRAWINGS

One or more embodiments will now be described, by way of example, with reference to the accompanying drawings, in which.

DETAILED DESCRIPTION

Figure 1:
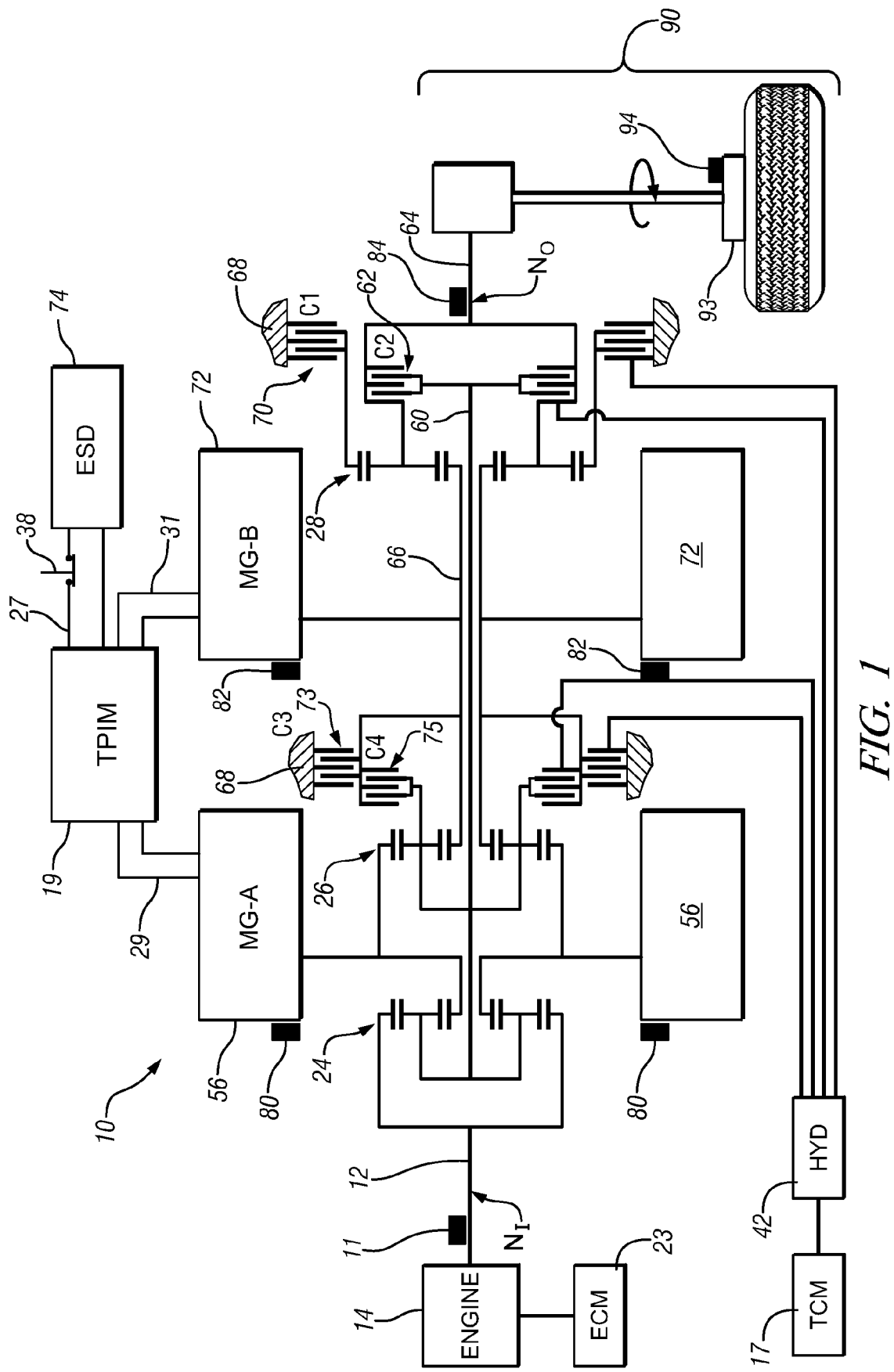
FIG. 1 is a schematic diagram of an exemplary powertrain, in accordance with the present disclosure.
Figure 2:
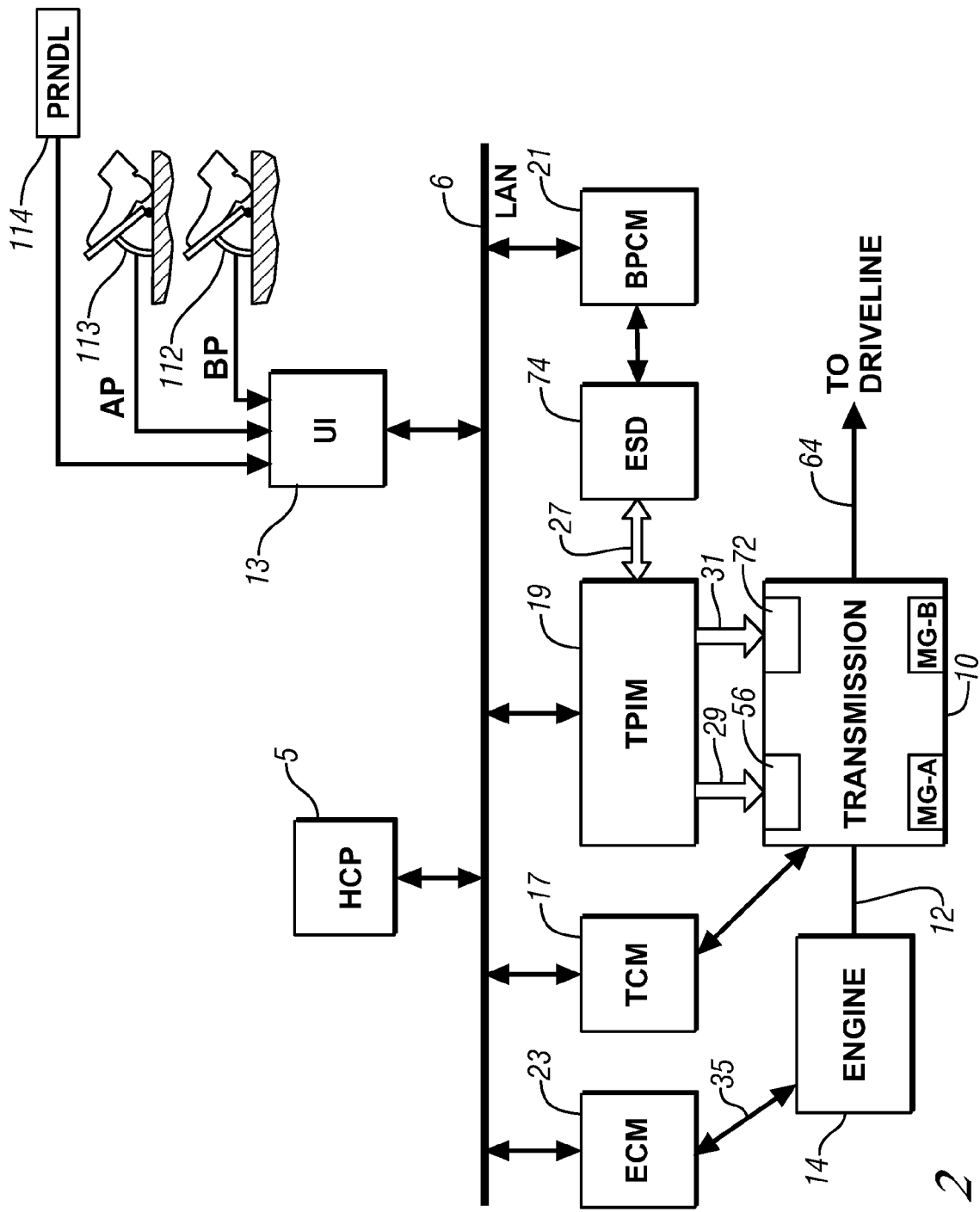
FIG. 2 is a schematic diagram of an exemplary architecture for a control system and powertrain, in accordance with the present disclosure.

Referring now to the drawings, wherein the showings are for the purpose of illustrating certain exemplary embodiments only and not for the purpose of limiting the same, FIGS. 1 and 2 depict an exemplary hybrid powertrain. The exemplary hybrid powertrain in accordance with the present disclosure is depicted in FIG. 1, comprising a two-mode, compound-split, electromechanical hybrid transmission 10 operatively connected to an engine 14 and first and second electric machines ('MG-A') 56 and ('MG-B') 72. The engine 14 and first and second electric machines 56 and 72 each generate power which can be transferred to the transmission 10. The power generated by the engine 14 and the first and second electric machines 56 and 72 and transferred to the transmission 10 is described in terms of input and motor torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transfer torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and engine torque, can differ from the input speed $N_I$ and the input torque $T_I$ to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transferring devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power to the driveline 90 that is transferred to vehicle wheels 93, one of which is shown in FIG. 1. The output power at the output member 64 is characterized in terms of an output rotational speed $N_O$ and an output torque $T_O$. A transmission output speed sensor 84 monitors rotational speed and rotational direction of the output member 64. Each of the vehicle wheels 93 is preferably equipped with a sensor 94 adapted to monitor wheel speed, the output of which is monitored by a control module of a distributed control module system described with respect to FIG. 2, to determine vehicle speed, and absolute and relative wheel speeds for braking control, traction control, and vehicle acceleration management.

The input torque from the engine 14 and the motor torques from the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31 to meet the torque commands for the first and second electric machines 56 and 72 in response to the motor torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary hybrid powertrain described in FIG. 1. The distributed control module system synthesizes pertinent information and inputs, and executes algorithms to control various actuators to meet control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electromechanical hybrid powertrain. The devices include an accelerator pedal 113 ('AP'), an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality including e.g., antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the hybrid powertrain, serving to coordinate operation of the ECM 23, TCM 17, TPIM 19, and BPCM 21. Based upon various input signals from the user interface 13 and the hybrid powertrain, including the ESD 74, the HCP 5 determines an operator torque request, an output torque command, an engine input torque command, clutch torque(s) for the applied torque-transfer clutches C1 70, C2 62, C3 73, C4 75 of the transmission 10, and the motor torques $T_A$ and $T_B$ for the first and second electric machines 56 and 72. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic control circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

A brake control module (hereafter 'BrCM') 22 is operatively connected to friction brakes (not shown) on each of the vehicle wheels 93. The BrCM 22 monitors the operator input to the brake pedal 112 and generates control signals to control the friction brakes and sends a control signal to the HCP 5 to operate the first and second electric machines 56 and 72 based thereon.

Each of the control modules ECM 23, TCM 17, TPIM 19, BPCM 21, and BrCM 22 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

The exemplary hybrid powertrain selectively operates in one of several operating range states that can be described in terms of an engine state comprising one of an engine-on state ('ON') and an engine-off state ('OFF'), and a transmission state comprising a plurality of fixed gears and continuously variable operating modes, described with reference to Table 1, below.

TABLE 1

| Description | Engine State | Transmission Operating Range State | Applied Clutches | |
|---|---|---|---|---|
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode 1, or M1, is selected by applying clutch C1 70 only in order to "ground" the outer gear member of the third planetary gear set 28. The engine state can be one of ON ('M1_Eng_On') or OFF ('M1_Eng_Off'). A second continuously variable mode, i.e., EVT Mode 2, or M2, is selected by applying clutch C2 62 only to connect the shaft 60 to the carrier of the third planetary gear set 28. The engine state can be one of ON ('M2_Eng_On') or OFF ('M2_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$. A first fixed gear operation ('G1') is selected by applying clutches C1 70 and C4 75. A second fixed gear operation ('G2') is selected by applying clutches C1 70 and C2 62. A third fixed gear operation ('G3') is selected by applying clutches C2 62 and C4 75. A fourth fixed gear operation ('G4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine torque commands to control the torque generative devices comprising the engine 14 and first and second electric machines 56 and 72 to meet the operator torque request at the output member 64 and transferred to the driveline 90. Based upon input signals from the user interface 13 and the hybrid powertrain including the ESD 74, the HCP 5 determines the operator torque request, a commanded output torque from the transmission 10 to the driveline 90, an input torque from the engine 14, clutch torques for the torque-transfer clutches C1 70, C2 62, C3 73, C4 75 of the transmission 10; and the motor torques for the first and second electric machines 56 and 72, respectively, as is described hereinbelow.

Final vehicle acceleration can be affected by other factors including, e.g., road load, road grade, and vehicle mass. The operating range state is determined for the transmission 10 based upon a variety of operating characteristics of the hybrid powertrain. This includes the operator torque request communicated through the accelerator pedal 113 and brake pedal 112 to the user interface 13 as previously described. The operating range state may be predicated on a hybrid powertrain torque demand caused by a command to operate the first and second electric machines 56 and 72 in an electrical energy generating mode or in a torque generating mode. The operating range state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby to manage fuel economy and battery charging. Furthermore, operation can be determined based upon a fault in a component or system. The HCP 5 monitors the torque-generative devices, and determines the power output from the transmission 10 required in response to the desired output torque at output member 64 to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electromechanical transmission 10 are mechanically-operatively coupled to transfer power therebetween to generate a power flow to the output member 64.

The operator torque request is determined by monitoring a level of engagement of the accelerator pedal 113 and brake pedal 112. Engagement levels of the brake pedal 112 and the accelerator pedal 113 correspond to levels at which the operator is depressing the brake pedal 112 and the accelerator pedal 113, respectively. The engagement levels of the brake pedal 112 and the accelerator pedal 113 correspond to levels of relative engagement from zero to one hundred percent. When regenerative braking is enabled, regenerative braking can be utilized in combination with friction braking to reduce vehicle speed in response to a decrease in the operator torque request. Regenerative braking comprises a vehicle operating state whereby vehicle kinetic energy is transmitted from the driveline 90 through the output member 64 to the transmission 10. The first and second electric machines 56 and 72 generate electric power for storage in the ESD 74 by reacting driveline torque that is generated by the vehicle kinetic energy through the driveline 90. Frictional braking comprises braking whereby frictional forces are generated by applying braking devices (not shown) of a friction braking system (not shown). The braking devices include disc brakes and drum brakes that are applied to generate frictional forces between the braking devices and the vehicle wheels 93, thereby decelerating the vehicle. When regenerative braking is disabled, friction braking alone is utilized to reduce vehicle speed in response to a decrease in the operator torque request.

Figure 3:
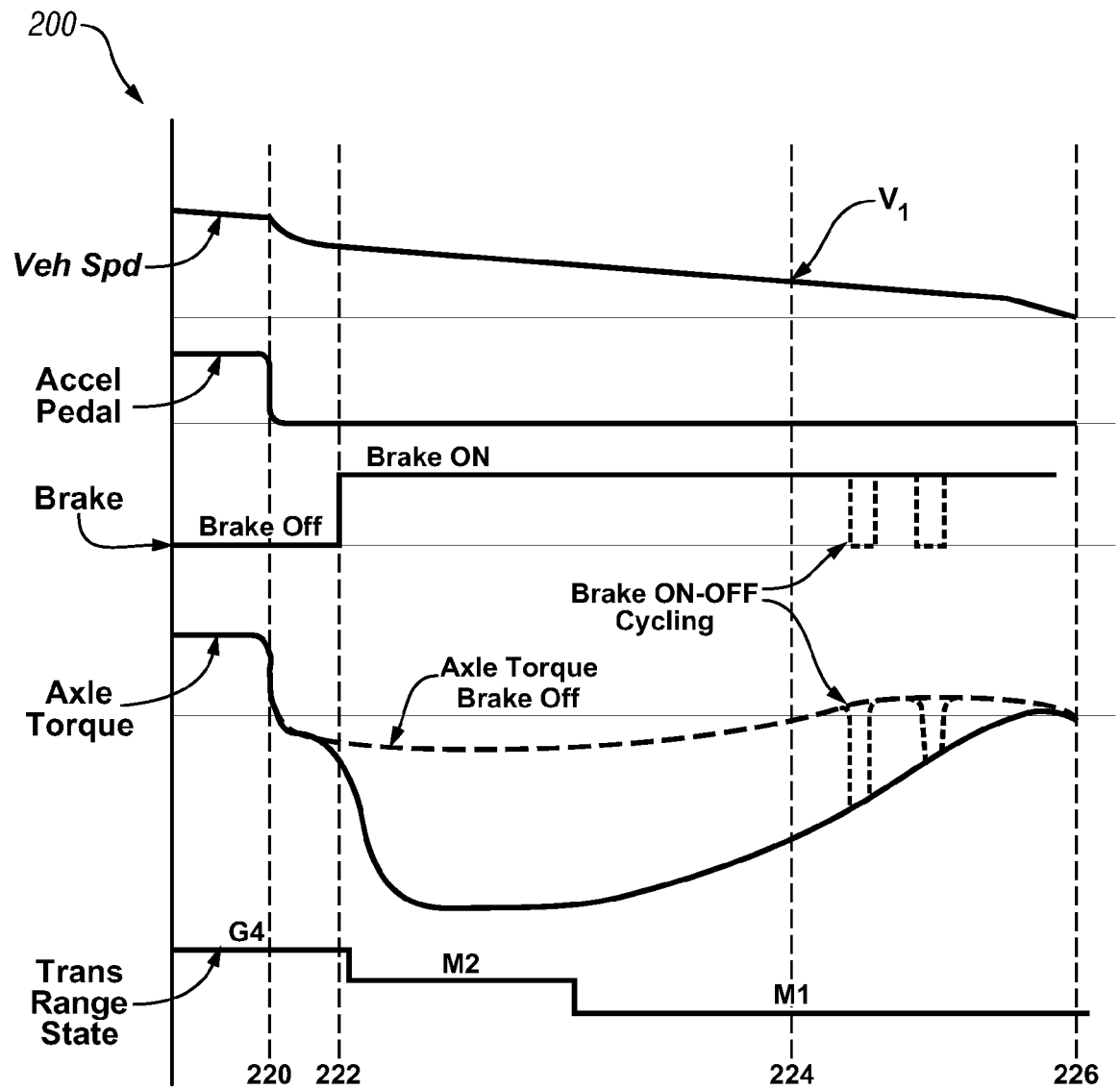
FIG. 3 is a graphical depiction of a method of regenerative braking, in accordance with the present disclosure.

FIG. 3 graphically shows a result of a method 200 for operating a vehicle (not shown) equipped with a hybrid powertrain system, e.g., as described with reference to FIGS. 1 and 2, to effect blended braking including friction braking and power-regenerative braking. The method 200 utilizes signals from sensors of the vehicle including the wheel speed sensor 94 ('VehSpd') and operator inputs measured using the accelerator pedal 113 ('Accel Pedal') and the brake pedal 112 ('Brake') plotted concurrently as a function of elapsed time. The method 200 utilizes the monitored signals to determine and control vehicle responses including an axle torque response ('Axle Torque') from the driveline 90 and the operating range state of the transmission 10 ('Trans Range State').

The method 200 is utilized to control power regeneration to control a rate of change in output torque $T_O$ and output speed $N_O$ in response to an operator torque request during a braking event. For example, the method 200 reduces variances in the rate of change in output torque $T_O$ and output speed $N_O$ due to changes in operating range states of the transmission 10 and changes in engine states. The method 200 includes inhibiting a change in the operating range state when operator torque request includes the brake pedal 112 being depressed and the accelerator pedal 113 being disengaged, i.e., the accelerator pedal has zero percent engagement (220). The operating range state can be determined by an algorithm or routine which determines a preferred system efficiency based upon the operator torque request, a state of charge of the ESD 74, and energy efficiencies of the engine 14 and the first and second electric machines 56 and 72. When an operator engages the accelerator pedal 113 and subsequently disengages the accelerator pedal 113 ('Brake ON-OFF Cycling'), the operating range state is inhibited from transitioning and therefore maintains the current operating range state. For example, FIG. 3 depicts the operating range state remaining in fourth fixed gear mode G4.

In an exemplary embodiment, an active fuel management control scheme controls the engine states to control fuel to the engine to improve fuel efficiency. The active fuel management control scheme can control whether the engine 14 is operating in one of an all-cylinder state and a cylinder deactivation state and one of a fueled state and a fuel cutoff state. When the engine 14 is operating in a cylinder deactivation state, a portion of the engine cylinders are deactivated and unfueled. When the engine 14 is operating in the fuel cutoff state, fuel is cutoff from the engine 14. Operation of the engine 14 is controlled based on an optimization function that determines a preferred engine state based on the operator torque request and the current vehicle speed. When the engine 14 transitions from a current preferred engine state to a new preferred engine state, there is no compound upshift disturbance from changing the operating range state of the transmission 10 since operating range state transitions of the transmission 10 are inhibited when the operator engages the accelerator pedal 113 and then subsequently disengages the accelerator pedal 113.

The method 200 further includes transitioning the operating range state from one of the fixed gear operating range states to one of the continuously variable operating range states when the vehicle deceleration rate is above a threshold, which is shown in FIG. 3 as occurring when the brake pedal 112 is engaged and the accelerator pedal 113 is disengaged (222). When the operating range state is in one of the fixed gears G1, G2, G3, G4 and when the brake pedal 112 is engaged, a command triggers transitioning of the operating range state from the fixed gear mode to one of the continuously variable modes M1, M2. In one embodiment, the operating range state is commanded to transition from one of fixed gears G3, G4 to continuously variable mode M2 and to transition from one of fixed gears G1, G2 to continuously variable mode M1. The operating range state of the transmission 10 is transitioned to the one of the continuously variable operating range states, e.g., M1 or M2, at the onset of regenerative braking activation. Therefore, when regenerative braking is active, the only permissible transitions in operating range state are between the first and second continuously variable operating range states. The regenerative braking operation is not disrupted by transitions between fixed and continuously variable operating range states, thereby reducing driveline disturbances induced thereby. Further, when the transmission 10 is in the continuously variable gear operating range state, input speed from the engine 14 can be adjusted to a preferred level to reduce backdrive friction, thereby increasing the amount of energy recovered during regenerative braking. FIG. 3 depicts a solid line corresponding to the axle torque ('Axle Torque') based on actual engagement of the brake pedal 112, wherein the operator disengages the brake pedal 112 prior to step 222 and the operator engages the brake pedal 112 subsequent to step 222. FIG. 3 further depicts a dashed line corresponding to a brake disengaged axle torque ('Axle Torque Brake OFF') corresponding to the axle torque at the corresponding vehicle speed and operating range state when the brake pedal 112 is disengaged subsequent to step 222.

The method 200 includes disabling regenerative braking when one of the accelerator pedal 113 is engaged and the brake pedal 112 is disengaged and when the vehicle speed is less than a first threshold speed ('$V_1$') (224). When the vehicle is coasting with the brake pedal 112 disengaged, the axle torque ramps from a negative axle torque as shown between steps 220 and 224 at high vehicle speed (for example, above 80 km/h) to a positive torque at low vehicle speeds between steps 224 and 226. When the regenerative braking is not active at low vehicle speeds, friction brakes (not shown) applied at the vehicle wheels 93 are preloaded by positive axle torque from the driveline 90 thereby reducing driveline lash disturbances. Further, at low vehicle speeds, the first and second electric machines 56 and 72 can generate motor torques $T_A$ and $T_B$ to the transmission 10 to generate an output torque $T_O$ that reacts with the driveline 90 to reduce vehicle speed. Therefore, alternating regenerative braking at low vehicles speeds can cause alternating negative axle torques from the driveline 90 when regenerative braking and positive axle torques from the driveline 90 when not regenerative braking ('Brake ON-OFF Cycling'), thereby resulting in an undesired drive quality. Therefore, the regenerative braking is disabled to maintain desired drive quality when one of the accelerator pedal 113 is engaged and the brake pedal 112 is disengaged and when the vehicle operates under the first threshold speed.

However, when the brake pedal 112 remains continuously engaged and the vehicle decelerates from vehicle speeds above the first threshold speed $V_1$ to vehicle speeds below the first threshold speed $V_1$, regenerative braking is not disabled at the first threshold speed $V_1$, but instead is disabled only when vehicle reaches a second threshold speed $V_2$ (not shown) that is less than the first threshold speed. Furthermore, when the brake pedal 112 is disengaged below the first threshold speed $V_1$, the regenerative braking remains disabled until the vehicle reaches a third threshold speed $V_3$, which is equal to a sum of the first threshold speed $V_1$ and a hysteresis speed value $V_h$. In an exemplary embodiment, the first threshold speed $V_1$ is equal to about 16 km/h, the hysteresis speed value $V_h$ is equal to 8 km/h and the second threshold speed $V_2$ is equal to 5 km/h. Thus, the third threshold speed $V_3$ is equal to 24 km/h. Therefore, when regenerative braking is disabled, it will not reactivate until vehicle speed exceeds the third threshold speed $V_3$ of 24 km/h, and the brake pedal is applied. By utilizing two different threshold speeds for controlling regenerative braking, the powertrain system can utilize regenerative braking to convert power through an entire braking profile when continuously braking from a vehicle speed above the first threshold speed $V_1$ to the third threshold speed $V_3$, while maintaining a desired drive quality when alternating accelerations and decelerations at low vehicle speeds. The vehicle is stopped (226) when the vehicle speed is equal to zero.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. Method for operating a vehicle including a powertrain system and a friction braking system, the powertrain system including a hybrid transmission operative in one of a fixed gear operating range state and a continuously variable operating range state to transmit torque between an input member and a torque machine and an output member coupled to a driveline, the method comprising:
    monitoring operator inputs to an accelerator pedal and a brake pedal;
    monitoring vehicle speed;
    maintaining the transmission in a present operating range state subsequent to the operator disengaging the accelerator pedal absent the operator engaging the brake pedal;
    transitioning the transmission device to a continuously variable operating range state subsequent to the operator disengaging the accelerator pedal and the operator engaging the brake pedal;
    executing regenerative braking by controlling the torque machine to react torque through the transmission to brake the vehicle through the driveline when the operator engages the brake pedal and the speed of the vehicle is greater than a first threshold; and
    disabling the regenerative braking when one of
        the speed of the vehicle is less than the first threshold and the operator disengages the brake pedal, and
        the speed of the vehicle decelerates to at least a second threshold less than the first threshold and the brake pedal is continuously engaged.

2. The method of claim 1, further comprising re-enabling regenerative braking through the driveline when the vehicle speed increases from a first vehicle speed below the first threshold to a second vehicle speed exceeding a third threshold.

3. The method of claim 2, wherein the third threshold is based on the first threshold and a hysteresis speed value.

4. The method of claim 1, further comprising executing friction braking and regenerative braking to reduce vehicle speed when regenerative braking is enabled, and executing friction braking to reduce vehicle speed when regenerative braking is disabled.

5. The method of claim 1, comprising providing a preloaded torque from a frictional brake to the driveline when the vehicle speed is between the first threshold and the second threshold.

6. The method of claim 1, further comprising:
determining an operator torque request based upon an engagement level of the brake pedal and the engagement level of the accelerator pedal; and
determining an operating range state of the transmission device based on an optimization routine based on the operator torque request when the operator is engaging the accelerator pedal.

7. The method of claim 1, further comprising:
determining new engine state when the accelerator pedal is disengaged based on an operator torque request and a current vehicle speed; and
transitioning the engine from a current engine state to the new engine state when the accelerator pedal is disengaged based on an operator torque request and a current vehicle speed.

8. The method of claim 7, wherein the engine state comprises one of a fuel cutoff engine state, a cylinder deactivation engine state, and a fuel cutoff and cylinder deactivation engine state.

9. The method of claim 7, wherein the current engine state comprises one of a fueled, all-cylinder engine state.

10. The method of claim 7, comprising transitioning between a first continuously variable operating range state and a second continuously variable operating range state absent an intervening transition to one of the fixed gear operating range states when executing regenerative braking.

11. Method for operating a vehicle including a friction braking system and a transmission device operative in one of a plurality of operating range states including a fixed gear mode and a continuously variable mode to transmit torque between an engine and an electric machine connected to an energy storage device, the method comprising:
monitoring operator inputs to an accelerator pedal and a brake pedal and monitoring vehicle speed;
maintaining the transmission device in a present operating range state subsequent to the operator disengaging the accelerator pedal;
transitioning the transmission device to a continuously variable operating range state subsequent to the operator engaging the brake pedal;
executing regenerative braking by controlling the torque machine to react torque through the transmission to brake the vehicle through the driveline when the operator engages the brake pedal and the speed of the vehicle is greater than a first threshold;
enabling regenerative braking so long as one of the brake pedal is engaged and the vehicle speed is greater than a second threshold less than the first threshold, and
disabling the regenerative braking when one of the speed of the vehicle is less than the first threshold and the operator disengages the brake pedal, and the speed of the vehicle decelerates to at least a second threshold less than the first threshold and the brake pedal is continuously engaged.

12. The method of claim 11, further comprising re-enabling the regenerative braking only when the vehicle speed exceeds a third threshold.

13. The method of claim 11, further comprising:
determining a new engine state when the accelerator pedal is disengaged based on an operator torque request and a current vehicle speed; and
transitioning the engine to the new engine state when the operator disengages the accelerator pedal based on an operator torque request and a current vehicle speed.

14. The method of claim 13, wherein the new engine state comprises one of a fuel cutoff engine state, a cylinder deactivation engine state, and a fuel cutoff and cylinder deactivation engine state.

15. The method of claim 11, further comprising:
determining an operator torque request based on a level of engagement of the accelerator pedal and a level of engagement of the brake pedal; and
determining a new operating range state of the transmission based on the operator torque request when the operator engages the accelerator pedal.

16. Method for operating a vehicle including a friction braking system and a hybrid transmission operative in one of a plurality of operating range states including a fixed gear and a continuously variable mode to transmit torque between an engine and an electric machine connected to an energy storage device, the method comprising:
monitoring operator inputs to an accelerator pedal and a brake pedal;
monitoring vehicle speed;
maintaining the transmission in a present operating range state subsequent to the operator disengaging the accelerator pedal absent engagement of the brake pedal;
transitioning the transmission to the continuously variable mode subsequent to the disengagement of the accelerator pedal and engagement of the brake pedal;
executing regenerative braking by controlling the torque machine to react torque through the transmission to brake the vehicle through the driveline when the brake pedal is engaged and the speed of the vehicle is greater than a first threshold; and
disabling the regenerative braking when one of
the speed of the vehicle is less than the first threshold and the operator disengages the brake pedal, and
the speed of the vehicle decelerates to at least a second threshold less than the first threshold and the brake pedal is continuously engaged.

17. The method of claim 16, further comprising:
determining an operator torque request based on a level of engagement of the accelerator pedal; and
determining a new operating range state of the transmission based on the operator torque request.

18. The method of claim 16, further comprising transitioning the engine state to a new engine state when the accelerator pedal is disengaged.

19. The method of claim 16, comprising transitioning between a first continuously variable operating range state and a second continuously variable operating range state absent an intervening transition to one of the fixed gear operating range states concurrent with the regenerative braking.

* * * * *